US012705911B2

(12) United States Patent
Sidak

(10) Patent No.: US 12,705,911 B2
(45) Date of Patent: Aug. 11, 2026

(54) SYSTEMS AND METHODS FOR GEOHASH-BASED IMAGE SCORING AND LABELING

(71) Applicant: Palantir Technologies Inc., Aventura, FL (US)

(72) Inventor: Christian Sidak, Golden Oak, FL (US)

(73) Assignee: Palantir Technologies Inc., Aventura, FL (US)

(*) Notice: Subject to any disclaimer, the term of this patent is extended or adjusted under 35 U.S.C. 154(b) by 238 days.

(21) Appl. No.: 18/219,334

(22) Filed: Jul. 7, 2023

(65) Prior Publication Data

US 2024/0013559 A1 Jan. 11, 2024

Related U.S. Application Data

(60) Provisional application No. 63/418,232, filed on Oct. 21, 2022, provisional application No. 63/359,375, filed on Jul. 8, 2022.

(51) Int. Cl.
*G06V 20/70* (2022.01)
*G06V 10/764* (2022.01)
*G06V 20/68* (2022.01)

(52) U.S. Cl.
CPC ............ *G06V 20/70* (2022.01); *G06V 10/764* (2022.01); *G06V 20/68* (2022.01); *G06V 2201/10* (2022.01)

(58) Field of Classification Search
CPC ...... G06V 20/70; G06V 10/764; G06V 20/68; G06V 2201/10
See application file for complete search history.

(56) References Cited

U.S. PATENT DOCUMENTS

| | | | |
|---|---|---|---|
| 8,897,604 B2 | 11/2014 | Deng et al. | |
| 8,977,629 B2 | 3/2015 | Goswami et al. | |
| 10,218,901 B2 | 2/2019 | Hao et al. | |
| 10,467,507 B1 * | 11/2019 | Hao | G06F 18/2415 |
| 2010/0048242 A1 | 2/2010 | Rhoads et al. | |
| 2015/0213612 A1 | 7/2015 | Lin et al. | |
| 2017/0374246 A1 | 12/2017 | Wang et al. | |
| 2018/0041692 A1 | 2/2018 | Qin et al. | |
| 2019/0279053 A1 * | 9/2019 | Bourdev | G06V 20/35 |
| 2022/0198779 A1 * | 6/2022 | Saraee | G06F 16/9536 |

* cited by examiner

*Primary Examiner* — Abhishek Sarma
(74) *Attorney, Agent, or Firm* — Faegre Drinker Biddle & Reath LLP

(57) ABSTRACT

Systems and methods for image scoring are disclosed. For example, the method includes: receiving a plurality of images, each image of the plurality of images associated with a geographic metadata, the plurality of images associated with one or more geographic metadata; selecting a first set of images from the plurality of images, each image in the first set of images being associated with a first geographic metadata that is one of the one or more geographic metadata; obtaining one or more first labels indicating one or more object classes respectively for each image in the first set of images; and determining one or more first scores for the one or more object classes for the first geographic metadata based at least in part on the one or more first labels.

16 Claims, 6 Drawing Sheets

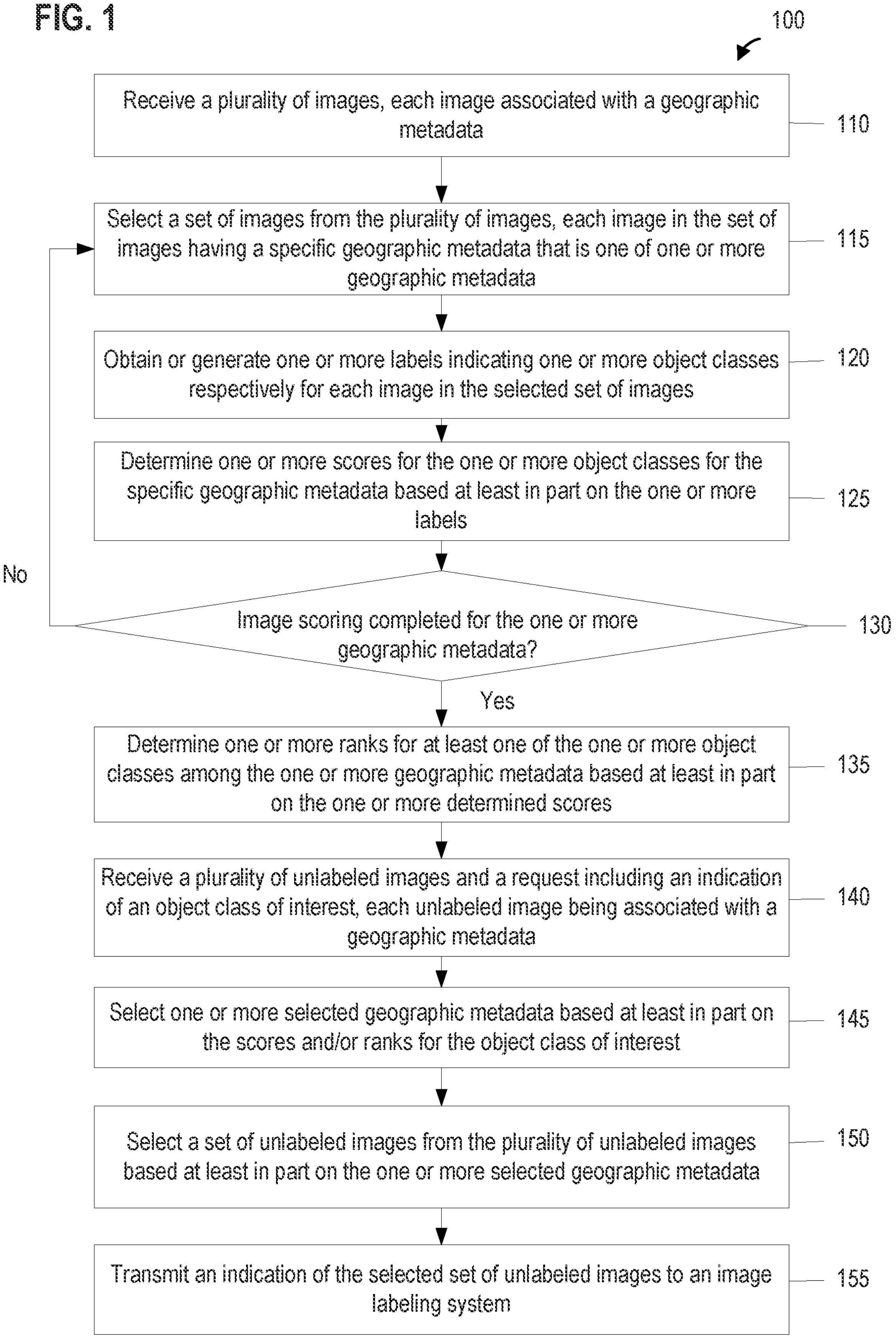

FIG. 1
100
Receive a plurality of images, each image associated with a geographic metadata
110
Select a set of images from the plurality of images, each image in the set of images having a specific geographic metadata that is one of one or more geographic metadata
115
Obtain or generate one or more labels indicating one or more object classes respectively for each image in the selected set of images
120
Determine one or more scores for the one or more object classes for the specific geographic metadata based at least in part on the one or more labels
125
No
Image scoring completed for the one or more geographic metadata?
130
Yes
Determine one or more ranks for at least one of the one or more object classes among the one or more geographic metadata based at least in part on the one or more determined scores
135
Receive a plurality of unlabeled images and a request including an indication of an object class of interest, each unlabeled image being associated with a geographic metadata
140
Select one or more selected geographic metadata based at least in part on the scores and/or ranks for the object class of interest
145
Select a set of unlabeled images from the plurality of unlabeled images based at least in part on the one or more selected geographic metadata
150
Transmit an indication of the selected set of unlabeled images to an image labeling system
155

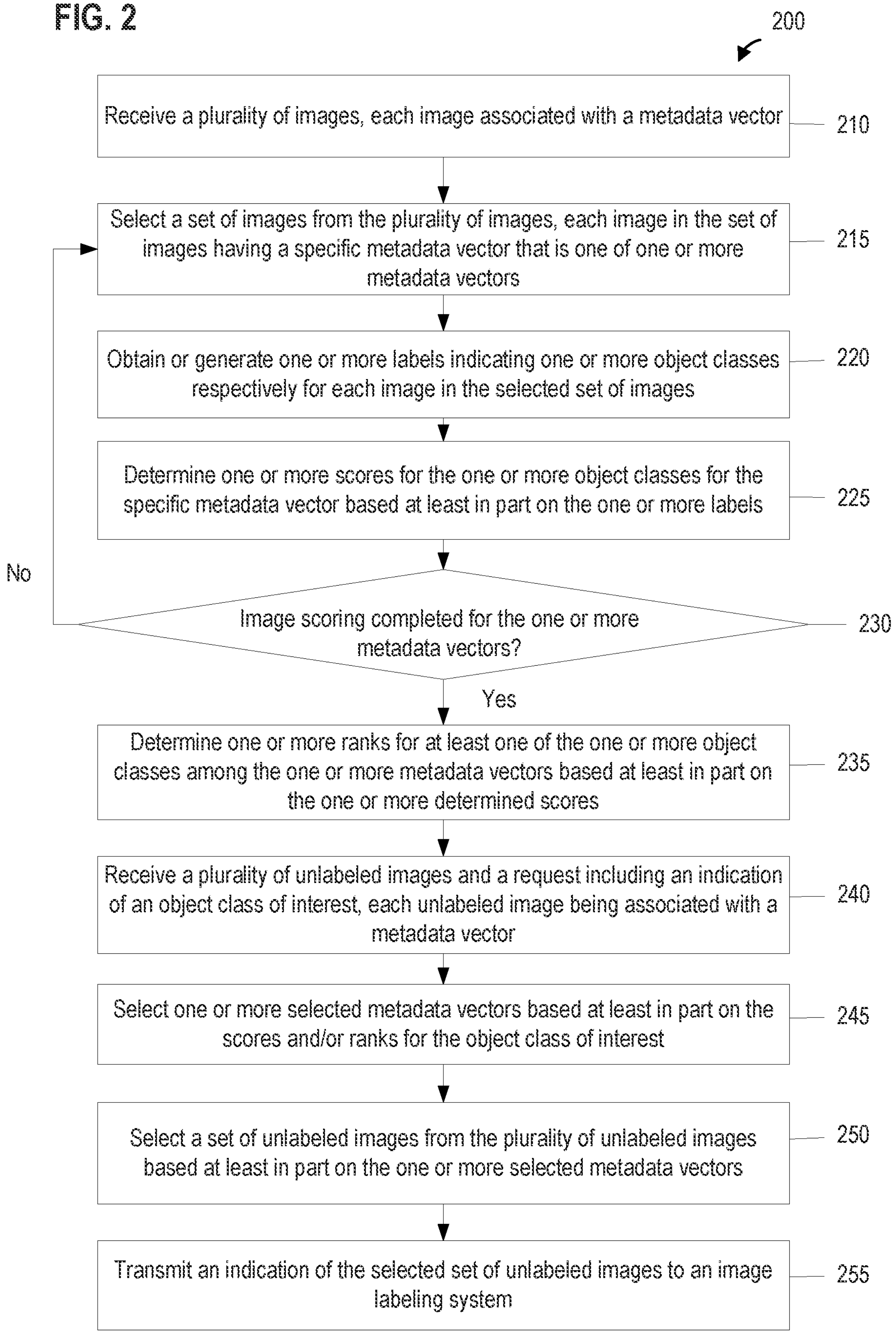

FIG. 2
200
Receive a plurality of images, each image associated with a metadata vector
210
Select a set of images from the plurality of images, each image in the set of images having a specific metadata vector that is one of one or more metadata vectors
215
Obtain or generate one or more labels indicating one or more object classes respectively for each image in the selected set of images
220
Determine one or more scores for the one or more object classes for the specific metadata vector based at least in part on the one or more labels
225
No
Image scoring completed for the one or more metadata vectors?
230
Yes
Determine one or more ranks for at least one of the one or more object classes among the one or more metadata vectors based at least in part on the one or more determined scores
235
Receive a plurality of unlabeled images and a request including an indication of an object class of interest, each unlabeled image being associated with a metadata vector
240
Select one or more selected metadata vectors based at least in part on the scores and/or ranks for the object class of interest
245
Select a set of unlabeled images from the plurality of unlabeled images based at least in part on the one or more selected metadata vectors
250
Transmit an indication of the selected set of unlabeled images to an image labeling system
255

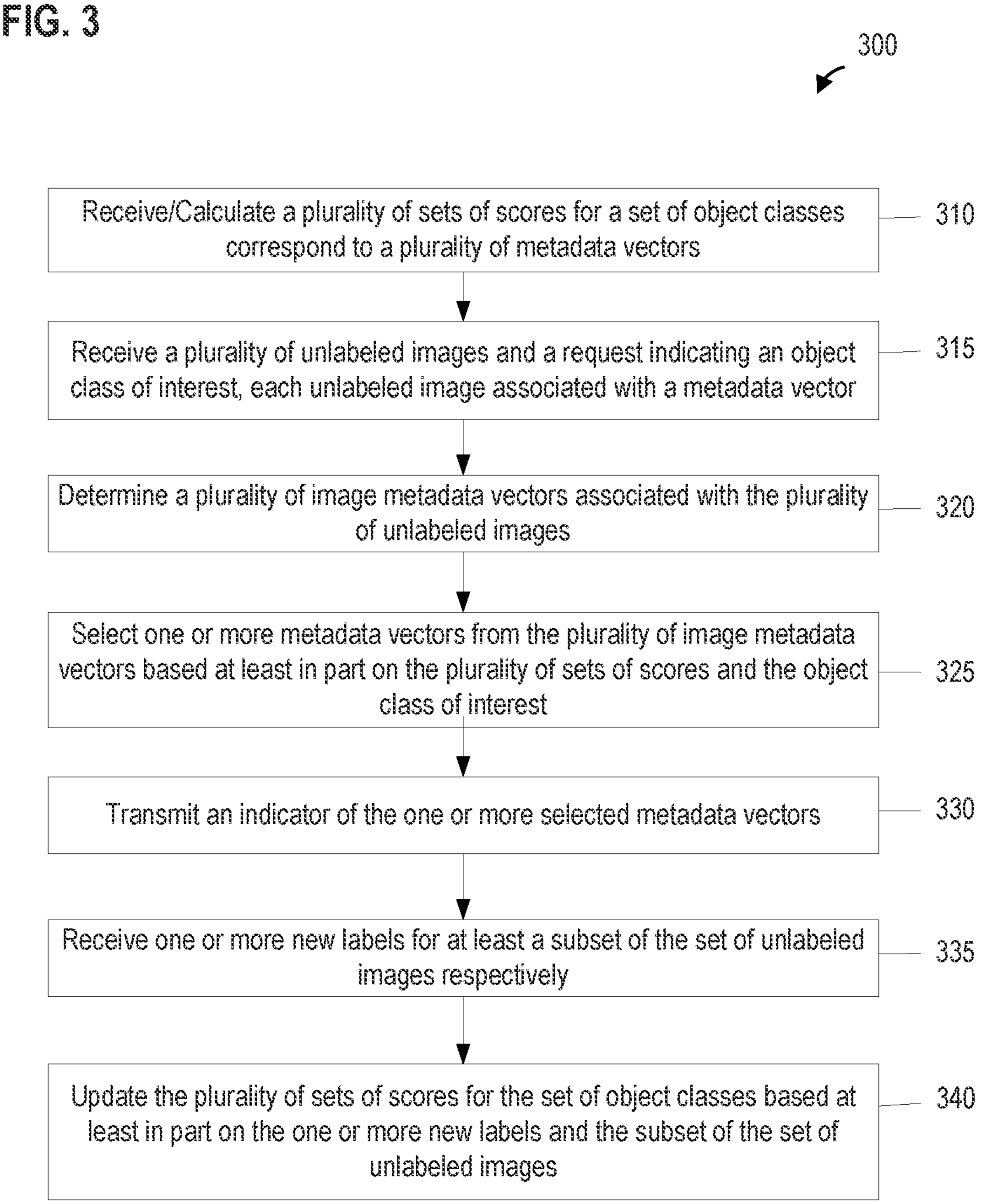

Receive/Calculate a plurality of sets of scores for a set of object classes correspond to a plurality of metadata vectors
310

Receive a plurality of unlabeled images and a request indicating an object class of interest, each unlabeled image associated with a metadata vector
315

Determine a plurality of image metadata vectors associated with the plurality of unlabeled images
320

Select one or more metadata vectors from the plurality of image metadata vectors based at least in part on the plurality of sets of scores and the object class of interest
325

Transmit an indicator of the one or more selected metadata vectors
330

Receive one or more new labels for at least a subset of the set of unlabeled images respectively
335

Update the plurality of sets of scores for the set of object classes based at least in part on the one or more new labels and the subset of the set of unlabeled images
340

SYSTEMS AND METHODS FOR GEOHASH-BASED IMAGE SCORING AND LABELING

CROSS REFERENCE TO RELATED APPLICATION

This application claims priority to U.S. Provisional Application No. 63/359,375, filed Jul. 8, 2022, and U.S. Provisional Application No. 63/418,232, filed Oct. 21, 2022, which are incorporated by reference herein in their entireties for all purposes.

TECHNICAL FIELD

Certain embodiments of the present disclosure are directed to systems and methods for image scoring and data selection. More particularly, some embodiments of the present disclosure provide systems and methods for image scoring based on metadata.

BACKGROUND

Computational models implementing artificial intelligence (AI) use a computational system to analyze data, for example, by continuously and autonomously improving the system's data processing capabilities based on training data (e.g., large amounts of data) that is inputted into the system as part of the training data for the AI. As such, the quality of the data that is inputted affects how well the system can improve the data processing capabilities. The inputted data may be images that are labeled with regard to the contents of the images such that. In some examples, by using the images, the system can improve an AI model in accurately interpreting the images (e.g., identifying objects in the images). For example, if the model is configured to identify fruit in an image, the training data may contain a large number of images that are labeled and contain fruit, and each type of fruit may be specified. In certain examples, labeling a large quantity of images is highly resource intensive, and it would a large amount of time for the millions of images to be manually labeled and reviewed.

Hence, it is desirable to improve the techniques for data selection.

SUMMARY

Certain embodiments of the present disclosure are directed to systems and methods for image scoring and data selection. More particularly, some embodiments of the present disclosure provide systems and methods for image scoring based on metadata.

According to some embodiments, a method for image scoring includes: receiving a plurality of images, each image of the plurality of images associated with a geographic metadata, the plurality of images associated with one or more geographic metadata; selecting a first set of images from the plurality of images, each image in the first set of images being associated with a first geographic metadata that is one of the one or more geographic metadata; obtaining one or more first labels indicating one or more object classes respectively for each image in the first set of images; and determining one or more first scores for the one or more object classes for the first geographic metadata based at least in part on the one or more first labels. The method is performed using one or more processors.

According to some embodiments, a method for image scoring includes: receiving a plurality of images, each image of the plurality of images associated with a metadata vector, the plurality of images associated with one or more metadata vectors; selecting a first set of images from the plurality of images, each image in the first set of images being associated with a first metadata vector that is one of the one or more metadata vectors; obtaining one or more first labels indicating one or more object classes respectively for each image in the first set of images; and determining one or more first scores for the one or more object classes for the first metadata vector based at least in part on the one or more first labels. The method is performed using one or more processors.

According to certain embodiments, a system for image scoring includes one or more memories having instructions stored therein, and one or more processors configured to execute the instructions and perform operations. The operations include: receiving a plurality of images, each image of the plurality of images associated with a geographic metadata, the plurality of images associated with one or more geographic metadata; selecting a first set of images from the plurality of images, each image in the first set of images being associated with a first geographic metadata that is one of the one or more geographic metadata; obtaining one or more first labels indicating one or more object classes respectively for each image in the first set of images; and determining one or more first scores for the one or more object classes for the first geographic metadata based at least in part on the one or more first labels.

Depending upon embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

The accompanying drawings are incorporated in and constitute a part of this specification and, together with the description, explain the features and principles of the disclosed embodiments. In the drawings, FIG. 1 is a simplified diagram showing a method for image scoring according to certain embodiments of the present disclosure;

FIG. 2 is a simplified diagram showing a method for image scoring according to certain embodiments of the present disclosure;

FIG. 3 is a simplified diagram showing a method for image scoring according to certain embodiments of the present disclosure;

DETAILED DESCRIPTION

Figure 4:
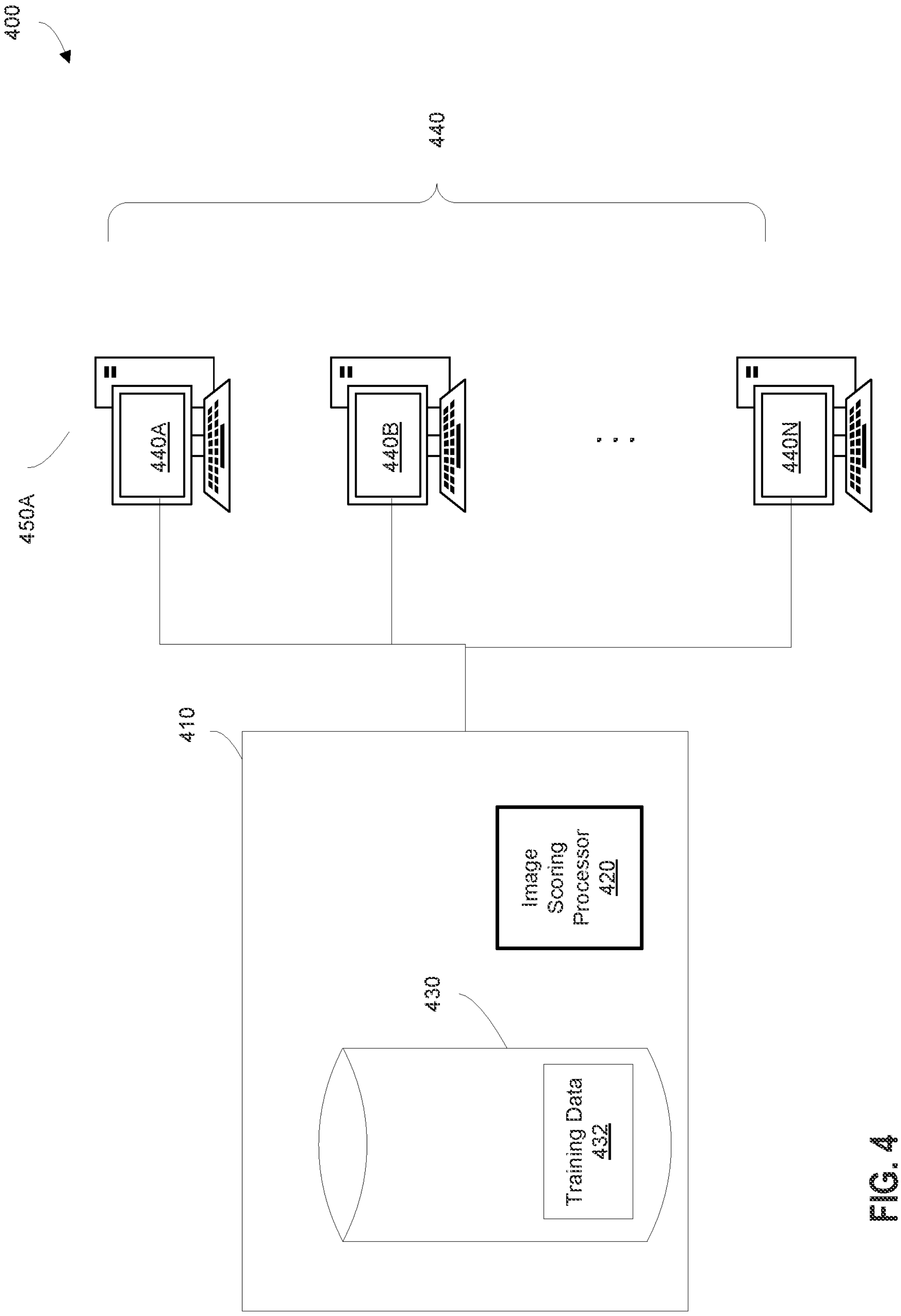
FIG. 4 depicts an illustrative diagram of an image scoring environment, in accordance with certain embodiments of the present disclosure.

Conventional systems and methods of implementing computational models, e.g., artificial intelligence (AI) model such as machine learning model, often do not consider the weaknesses of the model or cannot achieve describable performance, especially when the weakness lies in identifying objects that are relatively rare or do not appear very often in the training data that is inputted (for example, only about 1% of the total training data includes such object). Without enough training data for a particular object or object class in training data, even if more training data is inputted, if the frequency of the particular object or object class in such training data remains low, the AI model would remain having poor performance.

Various embodiments of the present disclosure can achieve benefits and/or improvements by a computing system incorporating image scoring, for example, to assign scores to the training data to be used for training computational models such as artificial intelligence (AI) models including but not limited to machine learning (ML) models, reinforcement learning (RL) models, deep learning (DL) models, and/or the like. In some embodiments, benefits include improvements including, for example, improved efficiency for the system to obtain and/or identify training data that is specifically targeted toward the area of weakness for a computational model, thereby improving the performance of the computational model in processing data. In various embodiments, benefits include providing the system the ability to prioritize, deprioritize, and/or re-score images to better meet the needs of the computational models, for example by eliminating irrelevant data from the training data and/or prioritizing relevant data in the training data, in order to improve the performance and/or the predictive capability of one or more computational models.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

According to some embodiments, machine learning analysts need millions of labeled images and/or other labeled data in order to train artificial intelligence (AI) models that can interpret images. In certain embodiments, an image refers to a still image, a live image, an image sequence, a video, and/or the like. In some embodiments, training corpus refers to labeled data (e.g., labeled images, other labeled data) for training AI models. In certain embodiments, data corpus includes raw data (e.g., unlabeled data) and/or training corpus. In certain embodiments, an AI model includes a machine learning (ML) model, a reinforcement learning (RL) model, a deep learning (DL) model, and/or the like. For example, if an analyst wants to train an AI model to identify fruits in an image, they will need to label a large quantity of images that contain fruit, and specify each class of label (e.g., mango, apple, orange).

In some embodiments, labeling is highly resource intensive. For example, human labelers spend lots of time labeling and reviewing millions of images. In certain embodiments, a label includes a representation of an object class (e.g., an indication of the object class). In some embodiments, a label includes an annotation (e.g., a box, a circle) added to the image and the representation of the object class (e.g., the number of objects of interest in the image). In certain embodiments, one or more images are associated with or integrated with geographic metadata. In some embodiments, the geographic metadata includes geohash (e.g., 8-character geohash, 12-character geohash). In certain embodiments, one or more images each is associated with or integrated with a metadata vector, where the metadata vector includes two or more dimensions (e.g., geographic metadata, time metadata, etc.). In some embodiments, the metadata vector includes metadata associated with image-taking environment. In certain embodiments, the metadata vector includes metadata not associated with the image parameter (e.g., hue, saturation, etc.).

According to certain embodiments, the burden becomes acute as the AI model attempts to predict rarer classes of objects. For example, if the machine learning model is bad at detecting pineapples, and the labelers need to label more pineapples in the image library to improve the model performance. As an example, a randomly selected image in a data corpus may only have a 1% chance of having a pineapple in it, and thus it is highly inefficient to randomly select images from the data corpus (e.g., raw data, unlabeled data) for labeling. At least some embodiments of the present disclosure are directed to systems and methods for scoring images associated with one or more certain metadata (e.g., geohash, geographic metadata) in the data corpus, where the score represents an estimated frequency (e.g., probability) that images associated with the one or more certain metadata contain an object class of interest (e.g., pineapples).

In certain embodiments, the scoring also includes an indication representing an estimated frequency (e.g., probability, an expected yield) that images associated with the certain metadata contain other object classes (e.g., apples, oranges) that are not the object class of interest. In some embodiments, the scoring is a ranking among different metadata (e.g., highest ranking, medium ranking, lowest ranking). In certain embodiments, an image scoring system can provide suggestions on the metadata for a request for labeling an object class of interest. In some embodiments, the image scoring system can select a set of unlabeled images based at least in part on the associated metadata (e.g., geohash) from a plurality of unlabeled images. In certain embodiments, such scoring and selection occur before image labeling.

According to some embodiments, the metadata associated with or integrated with an image includes geographic metadata representing geographic information, time metadata, other environmental metadata, and/or the like. In certain embodiments, time metadata includes one more of metadata indicating years, seasons, dates, time of days, and\or the like. In some embodiments, geographic metadata includes a geohash. In certain embodiments, unlabeled images are evaluated based upon a score for an object class of interest, for example, the score for the object class of interest higher than a predetermined threshold; and/or, a score for an object class (e.g., an uninterested object class) that is not the object class of interest, for example, the score for the uninterested object class less than a predetermined threshold.

According to certain embodiments, image scoring before labeling can increase (e.g., greatly increase) the efficiency of labeling by providing ML analysts with an expected yield of class labels for a given unlabeled image, based on the historical label yield of that image's source geography. In some embodiments, for a given unlabeled image, a ML analyst will not immediately know how many objects (e.g., apples, oranges, and pineapples) are contained in the image, but they will likely have geographic metadata indicating what geohash the image came from. In certain embodiments, an image scoring system scores all previously labeled geohashes in the existing training corpus, and then estimates the expected yield of different class labels for an unlabeled image.

According to some embodiments, the image scoring system automatically updates the geohash scores every time a new image is labeled, and thus learns over time which geohashes in the world are most abundant for different class labels. As an example, for fruits as object classes, geohashes in tropical zones like the Philippines and Taiwan would have higher scores for pineapples than geohashes in Iceland. In certain embodiments, if the ML analyst wants to acquire more pineapple labels, the image scoring system automatically recommends images from these tropical geohashes over arctic geohashes, based on the existing training corpus. In some embodiments, if newly labeled images from the Philippines began to return low quantities of pineapple labels, the image scoring system would automatically learn to update the scores (e.g., deprioritize, re-score) of these geohashes for the pineapple class. Certain embodiments of the present disclosure are relevant for object classes where geography has predictive power over labeled object classes.

FIG. 1 is a simplified diagram showing a method 100 for image scoring according to certain embodiments of the present disclosure. This diagram is merely an example. One of ordinary skill in the art would recognize many variations, alternatives, and modifications. The method 100 for image scoring includes processes 110, 115, 120, 125, 130, 135, 140, 145, 150, and 155. Although the above has been shown using a selected group of processes for the method 100 for image scoring, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

According to some embodiments, at the process 110, an image scoring system is configured to receive a plurality of images, where each image is associated with a geographic metadata. In certain embodiments, each image of the plurality of images is an unlabeled image. In some embodiments, each image of the plurality of images is a labeled image. In certain embodiments, the geographic metadata includes geohash. In some embodiments, the geohash can be a specific encoding, for example, an eight-character geohash, a four-character geohash, a twelve-character geohash, or the like. In some embodiments, the geographic metadata represents a geographic area.

Figure 5A:
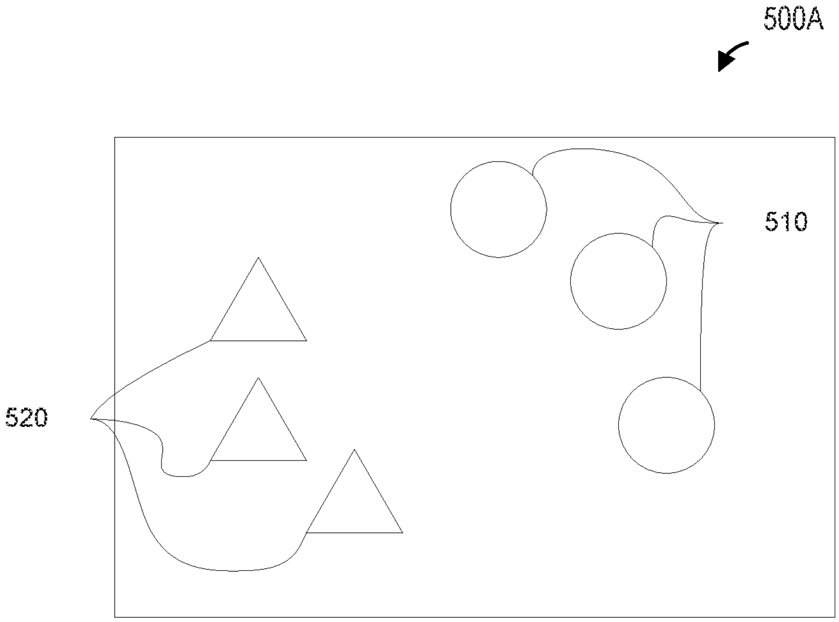
FIGS. 5A and 5B are illustrative example images.
Figure 5B:
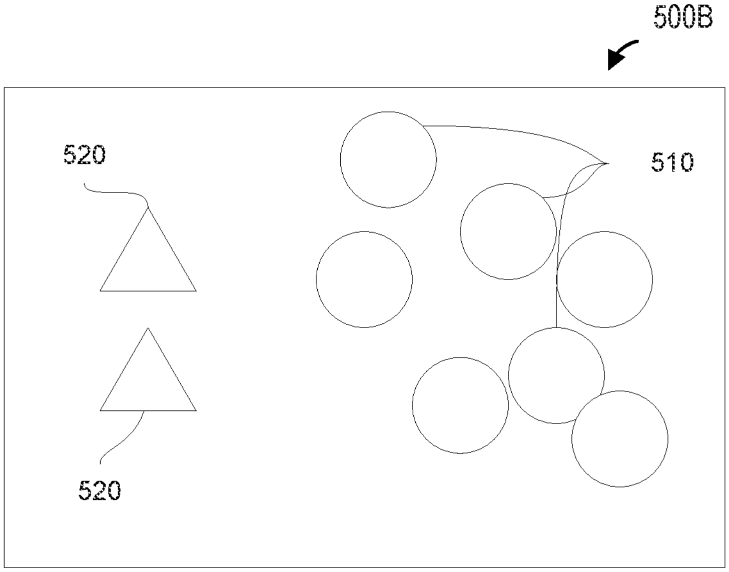

According to certain embodiments, at the process 115, the image scoring system selects a set of images from the plurality of images having a specific geographic metadata of one or more geographic metadata. In some embodiments, the image scoring system selects a set of images having a same geohash. In certain embodiments, at the process 120, the image scoring system is configured to obtain or generate one or more labels indicating one or more object classes respectively for each image in the selected set of images. In some embodiments, a label for the object class includes information related to an object of the object class in the images including, for example, a location in the image, the number of objects in the object class in the image, and/or the like. In certain examples, an image has one or more labels, where each label of the one or more labels is associated with an object class (e.g., a pineapple class, an apple class, an orange class). FIGS. 5A and 5B are two example images. FIG. 5A is an example image 500A including objects of object class 510 and objects of object class 520. In this example, in the image 500A, there are three objects of object class 510 and three objects of object class 520. FIG. 5B is an example image 500B including objects of object class 510 and objects of object class 520. In this example, in the image 500B, there are seven objects of object class 510 and two objects of object class 520.

According to some embodiments, at the process 125, the image scoring system determines one or more scores for the object classes for the specific geographic metadata (e.g., a geolocation area represented in the specific geographic metadata, pineapple class for Taiwan). In certain embodiments, a score of an object class is associated with a number of objects of the object class. In some embodiments, the score is an average of the number of objects of the object in images associated with a specific geographic metadata (e.g., a same geographic metadata). In certain embodiments, the score is an average of the number of objects of the object in images associated with a specific geohash. Using the examples illustrated in FIGS. 5A and 5B, assuming the images 500A and 500B are associated with a same geohash, the score for the object class 510 is 5 and the score for the object class 520 is 2.5. In some embodiments, the score is a normalized score based at least in part on the number of objects of the object in images associated with a same geographic metadata. In certain embodiments, the score is a normalized score based at least in part on the number of objects of the object in images associated with a same geohash. In some embodiments, the score is based at least in part on an output of a function applied to the number of objects of the object in images associated with a same geographic metadata. In certain embodiments, the score is based at least in part on an output of a function applied to the number of objects of the object in images associated with a same geohash.

According to certain embodiments, at the process 130, the image scoring system determines whether the imaging scoring process is completed for the one or more geographic metadata. If not, in some embodiments, the system will go back to the process 115 to select a set of images for the next geographic metadata. If yes, in certain embodiments, the system will go to the process 135 to determine ranking for the one or more geographic metadata for object classes.

According to some embodiments, at the process 135, the imaging scoring system determines one or more ranks for at least one of the object classes among the one or more geographic metadata based at least in part on the one or more determined scores. In certain embodiments, the ranks are determined based at least in part on the scores for a respective object class. For example, for the object class of pineapple, the scores for four geohash (e.g., Geohash 1, Geohash 2, Geohash 3, and Geohash 4) are respectively 10, 4, 15, and 9, and the ranks for the four geohash are 2, 4 (lowest), 1 (highest), and 3. In some embodiments, the ranks are determined based at least in part on the scores for an object class of interests and the scores for one or more uninterested object classes. As an example, the scores for the interested object class of pineapple for four geohash (e.g., Geohash 1, Geohash 2, Geohash 3, and Geohash 4) are respectively 10, 4, 15, and 9, the scores for the uninterested object class of orange for the four geohash are respectively 15, 3, 5, and 1, and the ranks for the interested object class of pineapple for the four geohash are 4 (lowest), 3, 1 (highest), and 2.

According to certain embodiments, at the process 140, the image scoring system receives a plurality of unlabeled images and a request including an indication of an object class of interest, where each unlabeled image of the plurality of unlabeled images is associated with or integrated with a geographic metadata. In some embodiments, the image scoring system determines or retrieves one or more geographic metadata (e.g., 10 geohashes) associated with the plurality of unlabeled images. In certain embodiments, the image scoring system retrieves the scores and/or the ranks for the object class of interest associated with the one or more geographic metadata.

According to some embodiments, at the process 145, the image scoring system selects one or more selected geographic metadata (e.g., 5 geohashes) from the one or more geographic metadata (e.g., 10 geohashes) associated with the plurality of unlabeled images based at least in part on the scores and/or ranks for the object class of interest, for example, using a set of criteria. In certain embodiments, the set of criteria includes one or more positive criteria and one or more negative criteria. In some embodiments, the set of criteria includes a positive criteria and a negative criteria. In certain embodiments, a selected geographic metadata has a score for the object class of interest greater than a threshold. In some embodiments, a selected geographic metadata has a score for the object class of interest greater than a first threshold and a score for an uninterested object class or an aggregated score for a plurality of uninterested object class lower than a second threshold. In certain embodiments, a selected geographic metadata has a score for the object class of interest greater than a predetermined threshold. In some embodiments, a selected geographic metadata has a score for the object class of interest greater than a first predetermined threshold (e.g., a threshold of 10) and a score for an uninterested object class or an aggregated score for a plurality of uninterested object class lower than a second predetermined threshold (e.g., a threshold of 5).

According to certain embodiments, at the process 150, the image scoring system selects a set of unlabeled images from the plurality of unlabeled images based at least in part on the one or more selected geographic metadata (e.g., 5 geohashes). In some embodiments, each unlabeled image in the set of selected unlabeled images is associated with or integrated with one of the one or more selected geographic metadata.

According to certain embodiments, at the process 155, the image scoring system transmits an indication of the selected set of unlabeled images, for example, to an image labeling system. In some embodiments, the indication of the set of selected unlabeled images includes the one or more selected geographic metadata. In certain embodiments, the indication of the set of selected unlabeled images includes the set of selected unlabeled images.

FIG. 2 is a simplified diagram showing a method 200 for an image scoring system according to certain embodiments of the present disclosure. This diagram is merely an example. One of ordinary skill in the art would recognize many variations, alternatives, and modifications. The method 200 for image scoring includes processes 210, 215, 220, 225, 230, 235, 240, 245, 250, and 255. Although the above has been shown using a selected group of processes for the method 200 for image scoring, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

According to some embodiments, at the process 210, the image scoring system is configured to receive a plurality of images (e.g., videos, still images, live images, image sequences, etc.), where each image is associated with a metadata vector. As used herein, a metadata vector includes one or more different metadata, for example, geographic and time metadata. In certain embodiments, each image of the plurality of images is an unlabeled image. In some embodiments, each image of the plurality of images is a labeled image. In certain embodiments, the metadata vector includes a geographic metadata. In one example, the geographic metadata includes geohash. In some embodiments, the geohash can be a specific encoding, for example, an eight-character geohash, a four-character geohash, a twelve-character geohash, or the like. In some embodiments, the geographic metadata represents a geographic area.

According to certain embodiments, at the process 215, the image scoring system selects a set of images from the plurality of images having a specific metadata vector of one or more metadata vectors. In some embodiments, the specific metadata vector includes a specific value or value range for each metadata in the metadata vector. For example, a metadata vector includes [a geohash, a season]. In some embodiments, the metadata vector includes two dimensions. In certain embodiments, the metadata vector includes three or more dimensions. In some embodiments, the metadata vector includes the set of images having a same geohash. In certain embodiments, at the process 220, the image scoring system is configured to obtain or generate one or more labels indicating one or more object classes respectively for each image in the selected set of images. In some embodiments, a label for the object class includes information related to an object of the object class in the images including, for example, a location in the image, the number of objects in the object class in the image, and/or the like. In certain examples, an image has one or more labels, where each label of the one or more labels is associated with an object class (e.g., a pineapple class, an apple class, an orange class). FIGS. 5A and 5B are two example images. FIG. 5A is an example image 500A including objects of object class 510 and objects of object class 520. In this example, in the image 500A, there are three objects of object class 510 and three objects of object class 520. FIG. 5B is an example image 500B including objects of object class 510 and objects of object class 520. In this example, in the image 500B, there are seven objects of object class 510 and two objects of object class 520.

According to some embodiments, at the process 225, the image scoring system determines one or more scores for the object classes for the specific metadata vector (e.g., a pineapple class for Taiwan in summers). In certain embodiments, a score of an object class is associated with a number of objects of the object class. In some embodiments, the score is an average of the number of objects of the object in images associated with a specific metadata vector (e.g., a metadata vector including a same geographic metadata and a same time or time range metadata). In certain embodiments, the score is an average of the number of objects of the object in images associated with a specific geohash. Using the examples illustrated in FIGS. 5A and 5B, assuming the images 500A and 500B are associated with a same geohash, the score for the object class 510 is 5 and the score for the object class 520 is 2.5. In some embodiments, the score is a normalized score based at least in part on the number of objects of the object in images associated with a same metadata vector. In certain embodiments, the score is a normalized score based at least in part on the number of objects of the object in images associated with a same metadata vector including a specific geohash and a specific time range. In some embodiments, the score is based at least in part on an output of a function applied to the number of objects of the object in images associated with a same metadata vector. In certain embodiments, the score is based at least in part on an output of a function applied to the number of objects of the object in images associated with a same metadata vector including a specific geohash and a specific time range.

According to certain embodiments, at the process 230, the image scoring system determines whether the imaging scoring process is completed for the one or more geographic metadata. If not, in some embodiments, the system will go back to the process 215 to select a set of images for the next metadata vector. If yes, in certain embodiments, the system will go to the process 235 to determine ranking for the one or more metadata vectors for object classes.

According to some embodiments, at the process 235, the imaging scoring system determines one or more ranks for at least one of the object classes among the one or more metadata vectors based at least in part on the one or more determined scores. In certain embodiments, the ranks are determined based at least in part on the scores for a respective object class. For example, for the object class of pineapple, the scores for four geohash (e.g., Vector 1, Vector 2, Vector 3, and Vector 4) are respectively 10, 4, 15, and 9, and the ranks for the four geohash are 2, 4 (lowest), 1 (highest), and 3. In some embodiments, the ranks are determined based at least in part on the scores for an object class of interests and the scores for one or more uninterested object classes. As an example, the scores for the interested object class of pineapple for four metadata vectors (e.g., [Geohash 1, Summer], [Geohash 1, Spring], [Geohash 2, Summer], and [Geohash 2, Spring]) are respectively 10, 4, 15, and 9, the scores for the uninterested object class of orange for the four geohash are respectively 15, 3, 5, and 1, and the ranks for the interested object class of pineapple for the four geohash are 4 (lowest), 3, 1 (highest), and 2.

According to certain embodiments, at the process 240, the image scoring system receives a plurality of unlabeled images and a request including an indication of an object class of interest, where each unlabeled image of the plurality of unlabeled images is associated with or integrated with a metadata vector. In some embodiments, the image scoring system determines or retrieves one or more metadata vectors (e.g., 10 metadata vectors) associated with the plurality of unlabeled images. In certain embodiments, the image scoring system retrieves the scores and/or the ranks for the object class of interest associated with the one or more geographic metadata.

According to some embodiments, at the process 245, the image scoring system selects one or more selected metadata vectors (e.g., 5 metadata vectors) from the one or more metadata vectors (e.g., 10 metadata vectors) associated with the plurality of unlabeled images based at least in part on the scores and/or ranks for the object class of interest, for example, using a set of criteria. In certain embodiments, the set of criteria includes one or more positive criteria and one or more negative criteria. In some embodiments, the set of criteria includes a positive criteria (e.g., greater than a threshold) and a negative criteria (e.g., smaller than a threshold). In certain embodiments, a selected metadata vector is associated with a set of scores having a score for the object class of interest greater than a threshold. In some embodiments, a selected metadata vector is associated with a set of scores having a first score for the object class of interest greater than a first threshold and a second score for an uninterested object class or an aggregated score for a plurality of uninterested object class lower than a second threshold. In certain embodiments, a selected metadata vector is associated with a set of scores having a score for the object class of interest greater than a predetermined threshold. In some embodiments, a selected metadata vector is associated with a set of scores having a first score for the object class of interest greater than a first predetermined threshold (e.g., a threshold of 10) and a second score for an uninterested object class or an aggregated score for a plurality of uninterested object class lower than a second predetermined threshold (e.g., a threshold of 5).

According to certain embodiments, at the process 250, the image scoring system selects a set of unlabeled images from the plurality of unlabeled images based at least in part on the one or more selected metadata vectors (e.g., 5 metadata vectors). In some embodiments, each unlabeled image in the set of selected unlabeled images is associated with or integrated with one of the one or more selected geographic metadata.

According to certain embodiments, at the process 255, the image scoring system transmits an indication of the selected set of unlabeled images, for example, to an image labeling system. In some embodiments, the indication of the set of selected unlabeled images includes the one or more selected geographic metadata. In certain embodiments, the indication of the set of selected unlabeled images includes the set of selected unlabeled images.

FIG. 3 is a simplified diagram showing a method 300 for image scoring according to certain embodiments of the present disclosure. This diagram is merely an example. One of ordinary skill in the art would recognize many variations, alternatives, and modifications. The method 300 for image scoring includes processes 310, 315, 320, 325, 330, 335, and 340. Although the above has been shown using a selected group of processes for the method 300 for image scoring, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

According to some embodiments, at the process 310, an image scoring system is configured to receive or calculate a plurality of sets of scores for a set of object classes corresponding to a plurality of metadata vectors. In certain examples, a set of scores are associated with a set of object classes (e.g., a first score for a pineapple class, a second score for an apple class, and a third score for an orange class) for each metadata vector of the plurality of metadata vectors (e.g., a location during a time period).

According to certain embodiments, at the process 315, the image scoring system receives a plurality of unlabeled images and a request including an indication of an object class of interest, where each unlabeled image of the plurality of unlabeled images is associated with or integrated with a metadata vector. In some embodiments, the image scoring system determines or retrieves one or more metadata vectors (e.g., 10 metadata vectors) associated with the plurality of unlabeled images. In certain embodiments, the image scoring system retrieves the scores and/or the ranks for the object class of interest associated with the one or more geographic metadata.

According to some embodiments, at the process 320, the image scoring system determines a plurality of image metadata vectors associated with the plurality of unlabeled images. In some embodiments, at the process 325, the image scoring system selects one or more selected metadata vectors (e.g., 5 metadata vectors) from the plurality of image metadata vectors (e.g., 10 metadata vectors) associated with the plurality of unlabeled images based at least in part on the plurality of set of scores and the object class of interest. In certain embodiments, a selected metadata vector is associated with a set of scores having a score for the object class of interest greater than a threshold. In some embodiments, a selected metadata vector is associated with a set of scores having a first score for the object class of interest greater than a first threshold and a second score for an uninterested object class or an aggregated score for a plurality of uninterested object class lower than a second threshold. In certain embodiments, a selected metadata vector is associated with a set of scores having a score for the object class of interest greater than a predetermined threshold. In some embodiments, a selected metadata vector is associated with a set of scores having a first score for the object class of interest greater than a first predetermined threshold (e.g., a threshold of 10) and a second score for an uninterested object class or an aggregated score for a plurality of uninterested object class lower than a second predetermined threshold (e.g., a threshold of 5).

According to certain embodiments, at the process 330, the image scoring system transmits an indication of the one or more selected metadata vectors (e.g., 5 metadata vectors), for example, to an image labeling system. In some embodiments, at the process 335, the image scoring system receives one or more new labels for at least a subset of the set of unlabeled images respectively, for example, from the image labeling system. For example, a subset of unlabeled images being associated with the one or more selected metadata vectors are labeled. In certain embodiments, at the process 340, the image scoring system updates the plurality of sets of scores for the set of object classes based at least in part on the one or more new labels and the subset of the set of unlabeled images.

FIG. 4 is an illustrative example of an image scoring environment 400, according to certain embodiments of the present disclosure. FIG. 4 is merely an example. One of the ordinary skilled in the art would recognize many variations, alternatives, and modifications. According to certain embodiments, the image scoring environment 400 includes an image scoring system 410 and one or more image labeling systems 440 (e.g., image labeling system 440A, image labeling system 440B, . . . , image labeling system 440N). According to some embodiments, the image scoring system 410 includes one or more processors 420 for image scoring and one or more memories 430, also refers to as a repository 430. In certain embodiments, the repository 430 includes one or more training data repository 432 for storing data (e.g., labeled images for training one or more AI models, raw data, unlabeled data, etc.). In some embodiments, the repository 430 can be accessed by the one or more image labeling systems 440. Although the above has been shown using a selected group of components in the image scoring environment 400, there can be many alternatives, modifications, and variations. For example, some of the components may be expanded and/or combined. Other components may be inserted into those noted above. Depending upon the embodiment, the arrangement of components may be interchanged with others replaced. Further details of these components are found throughout the present disclosure.

According to some embodiments, the image scoring system 410 is configured to receive a plurality of images (e.g., videos, still images, live images, image sequences, etc.), for example, from the training data repository 432, where each image is associated with a metadata vector. As used herein, a metadata vector includes one or more different metadata, for example, geographic and time metadata. In certain embodiments, each image of the plurality of images is an unlabeled image. In some embodiments, each image of the plurality of images is a labeled image. In certain embodiments, the metadata vector includes a geographic metadata. In one example, the geographic metadata includes geohash. In some embodiments, the geohash can be a specific encoding, for example, an eight-character geohash, a four-character geohash, a twelve-character geohash, or the like. In some embodiments, the geographic metadata represents a geographic area.

According to certain embodiments, the image scoring system 410 selects a set of images from the plurality of images having a specific metadata vector of one or more metadata vectors. In some embodiments, the specific metadata vector includes a specific value or value range for each metadata in the metadata vector. For example, a metadata vector includes [a geohash, a season]. In some embodiments, the metadata vector includes two dimensions. In certain embodiments, the metadata vector includes three or more dimensions. In some embodiments, the metadata vector includes a set of images having a same geohash. In certain embodiments, the image scoring system 410 is configured to obtain or generate one or more labels indicating one or more object classes respectively for each image in the selected set of images. In some embodiments, a label for the object class includes information related to an object of the object class in the images including, for example, a location in the image, the number of objects in the object class in the image, and/or the like. In certain examples, an image has one or more labels, where each label of the one or more labels is associated with an object class (e.g., a pineapple class, an apple class, an orange class). FIGS. 5A and 5B are two example images. FIG. 5A is an example image 500A including objects of object class 510 and objects of object class 520. In this example, in the image 500A, there are three objects of object class 510 and three objects of object class 520. FIG. 5B is an example image 500B including objects of object class 510 and objects of object class 520. In this example, in the image 500B, there are seven objects of object class 510 and two objects of object class 520.

According to some embodiments, the image scoring system 410 determines one or more scores for the object classes for the specific metadata vector (e.g., a pineapple class for Taiwan in summers). In certain embodiments, a score of an object class is associated with a number of objects of the object class. In some embodiments, the score is an average of the number of objects of the object in images associated with a specific metadata vector (e.g., a metadata vector including a same geographic metadata and a same time or time range metadata). In certain embodiments, the score is an average of the number of objects of the object in images associated with a specific geohash. Using the examples illustrated in FIGS. 5A and 5B, assuming the images 500A and 500B are associated with a same geohash, the score for the object class 510 is 5 and the score for the object class 520 is 2.5. In some embodiments, the score is a normalized score based at least in part on the number of objects of the object in images associated with a same metadata vector. In certain embodiments, the score is a normalized score based at least in part on the number of objects of the object in images associated with a same metadata vector including a specific geohash and a specific time range. In some embodiments, the score is based at least in part on an output of a function applied to the number of objects of the object in images associated with a same metadata vector. In certain embodiments, the score is based at least in part on an output of a function applied to the number of objects of the object in images associated with a same metadata vector including a specific geohash and a specific time range.

According to certain embodiments, the image scoring system 410 determines whether the imaging scoring process is completed for the one or more geographic metadata. If not, in some embodiments, the system will go back to select a set of images for the next metadata vector. If yes, in certain embodiments, the system will go to determine ranking for the one or more metadata vectors for object classes.

According to some embodiments, the imaging scoring system determines one or more ranks for at least one of the object classes among the one or more metadata vectors based at least in part on the one or more determined scores. In certain embodiments, the ranks are determined based at least in part on the scores for a respective object class. For example, for the object class of pineapple, the scores for four geohash (e.g., Vector 1, Vector 2, Vector 3, and Vector 4) are respectively 10, 4, 15, and 9, and the ranks for the four geohash are 2, 4 (lowest), 1 (highest), and 3. In some embodiments, the ranks are determined based at least in part on the scores for an object class of interests and the scores for one or more uninterested object classes. As an example, the scores for the interested object class of pineapple for four metadata vectors (e.g., [Geohash 1, Summer], [Geohash 1, Spring], [Geohash 2, Summer], and [Geohash 2, Spring]) are respectively 10, 4, 15, and 9, the scores for the uninterested object class of orange for the four geohash are respectively 3, 5, and 1, and the ranks for the interested object class of pineapple for the four geohash are 4 (lowest), 3, 1 (highest), and 2.

According to certain embodiments, the image scoring system 410 receives a plurality of unlabeled images and a request including an indication of an object class of interest, where each unlabeled image of the plurality of unlabeled images is associated with or integrated with a metadata vector. In some embodiments, the image scoring system 410 determines or retrieves one or more metadata vectors (e.g., 10 metadata vectors) associated with the plurality of unlabeled images. In certain embodiments, the image scoring system 410 retrieves the scores and/or the ranks for the object class of interest associated with the one or more geographic metadata.

According to some embodiments, the image scoring system 410 selects one or more selected metadata vectors (e.g., 5 metadata vectors) from the one or more metadata vectors (e.g., 10 metadata vectors) associated with the plurality of unlabeled images based at least in part on the scores and/or ranks for the object class of interest, for example, using a set of criteria. In certain embodiments, the set of criteria includes one or more positive criteria and one or more negative criteria. In some embodiments, the set of criteria includes a positive criteria (e.g., greater than a threshold) and a negative criteria (e.g., smaller than a threshold). In certain embodiments, a selected metadata vector is associated with a set of scores having a score for the object class of interest greater than a threshold. In some embodiments, a selected metadata vector is associated with a set of scores having a first score for the object class of interest greater than a first threshold and a second score for an uninterested object class or an aggregated score for a plurality of uninterested object class lower than a second threshold. In certain embodiments, a selected metadata vector is associated with a set of scores having a score for the object class of interest greater than a predetermined threshold. In some embodiments, a selected metadata vector is associated with a set of scores having a first score for the object class of interest greater than a first predetermined threshold (e.g., a threshold of 10) and a second score for an uninterested object class or an aggregated score for a plurality of uninterested object class lower than a second predetermined threshold (e.g., a threshold of 5).

According to certain embodiments, the image scoring system 410 selects a set of unlabeled images from the plurality of unlabeled images based at least in part on the one or more selected metadata vectors (e.g., 5 metadata vectors). In some embodiments, each unlabeled image in the set of selected unlabeled images is associated with or integrated with one of the one or more selected geographic metadata.

According to certain embodiments, the image scoring system 410 transmits an indication of the selected set of unlabeled images, for example, to an image labeling system 440. In some embodiments, the indication of the set of selected unlabeled images includes the one or more selected geographic metadata. In certain embodiments, the indication of the set of selected unlabeled images includes the set of selected unlabeled images.

In some embodiments, the repository 430 can include images, unlabeled images, training data, labeled images, labeled training data, metadata vectors associated with images, scores associated with metadata vectors, ranks associated with metadata vectors, and/or the like. The repository 430 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the image scoring environment 400 can execute software or firmware stored in non-transitory computer-readable medium to implement various processing steps. Various components and processors of the image scoring environment 400 can be implemented by one or more computing devices including, but not limited to, circuits, a computer, a cloud-based processing unit, a processor, a processing unit, a microprocessor, a mobile computing device, and/or a tablet computer. In some cases, various components of the image scoring environment 400 (e.g., the image scoring system 410, the image labeling systems 440) can be implemented on a shared computing device. Alternatively, a component of the image scoring environment 400 can be implemented on multiple computing devices. In some implementations, various modules and components of the image scoring environment 400 can be implemented as software, hardware, firmware, or a combination thereof. In some cases, various components of the image scoring environment 400 can be implemented in software or firmware executed by a computing device.

Various components of the image scoring environment 400 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 6:
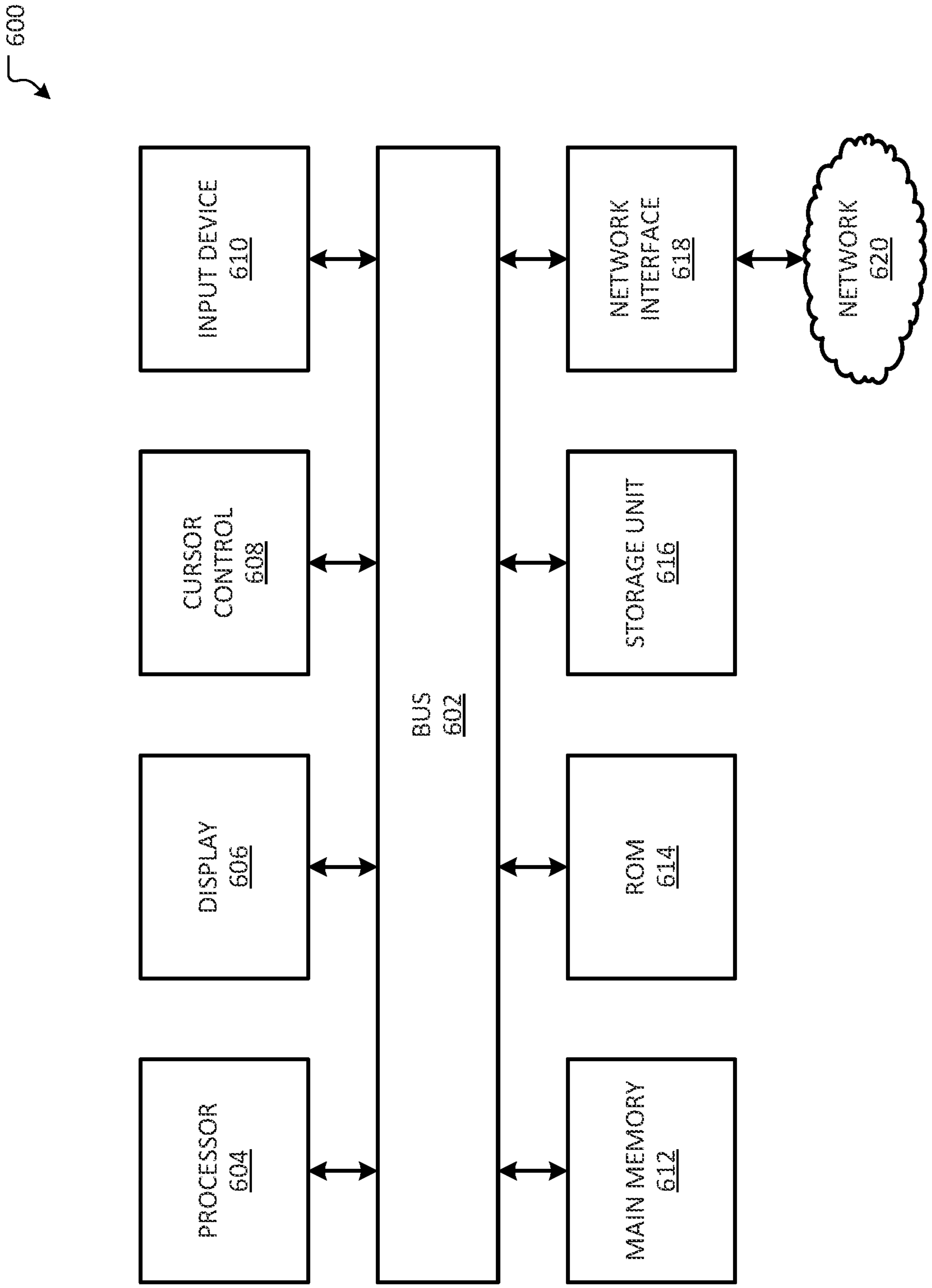
FIG. 6 is a simplified diagram showing a computing system for implementing a system for image scoring in accordance with at least one example set forth in the disclosure.

FIG. 6 is a simplified diagram showing a computing system for implementing a system 600 for image scoring in accordance with at least one example set forth in the disclosure. This diagram is merely an example, which should not unduly limit the scope of the claims. One of ordinary skill in the art would recognize many variations, alternatives, and modifications.

The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the methods 100, 200 and/or 300 are performed by the computing system 600. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control component 608 (e.g., a mouse, a trackball, or cursor direction keys) is configured to communicate additional information and commands (e.g., to control cursor movements on the display 606) to the processor 604.

According to certain embodiments, a method for image scoring is disclosed, where the method includes the steps of: receiving a plurality of images, each image of the plurality of images associated with a geographic metadata, the plurality of images associated with one or more geographic metadata; selecting a first set of images from the plurality of images, each image in the first set of images being associated with a first geographic metadata that is one of the one or more geographic metadata; obtaining one or more first labels indicating one or more object classes respectively for each image in the first set of images; and determining one or more first scores for the one or more object classes for the first geographic metadata based at least in part on the one or more first labels. The method is performed using one or more processors. For example, the method is implemented according to at least FIG. 1, FIG. 3, and/or FIG. 4.

In some embodiments, each geographic metadata of the one or more geographic metadata includes a geohash. In certain embodiments, the method includes the step of selecting a second set of images from the plurality of images, each image in the second set of images being associated with a second geographic metadata that is one of the one or more geographic metadata; obtaining one or more second labels indicating the one or more object classes respectively for each image in the second set of images; and determining one or more second scores for the one or more object classes for the second geographic metadata based at least in part on the one or more second labels. In some embodiments, the method includes the step of receiving a plurality of unlabeled images and a request including an indication of an object class of interest; and determining a plurality of geographic metadata associated with the plurality of unlabeled images, the plurality of geographic metadata including the first geographic metadata and the second geographic metadata.

In certain embodiments, the method further includes the steps of selecting one or more selected geographic metadata from the plurality of geographic metadata based at least in part on the one or more first scores and the one or more second scores. In some embodiments, the method includes the steps of selecting a set of unlabeled images from the plurality of unlabeled images based at least in part on the one or more selected geographic metadata; and transmitting an indication of the selected set of unlabeled images to an image labeling system. In certain embodiments, the selecting one or more selected geographic metadata from the plurality of geographic metadata comprises: selecting the first geographic metadata if a first object score corresponding to the object class of interest is higher than a first threshold, wherein the first object score is one of the one or more first scores. In some embodiments, the selecting one or more selected geographic metadata from the plurality of geographic metadata further comprises: selecting the first geographic metadata if a second object score corresponding to an uninterested object class is lower than a second threshold, wherein the second object score is one of the one or more first scores.

According to some embodiments, a method for image scoring is disclosed, where the method includes the steps of: receiving a plurality of images, each image of the plurality of images associated with a metadata vector, the plurality of images associated with one or more metadata vectors; selecting a first set of images from the plurality of images, each image in the first set of images being associated with a first metadata vector that is one of the one or more metadata vectors; obtaining one or more first labels indicating one or more object classes respectively for each image in the first set of images; and determining one or more first scores for the one or more object classes for the first metadata vector based at least in part on the one or more first labels; wherein the method is performed using one or more processors. For example, the method is implemented according to at least FIG. 2, FIG. 3, and/or FIG. 4.

In certain embodiments, each metadata vector of the one or more metadata vectors includes two or more dimensions. In some embodiments, the method further includes the steps of: selecting a second set of images from the plurality of images, each image in the second set of images being associated with a second metadata vector that is one of the one or more metadata vectors; obtaining one or more second labels indicating the one or more object classes respectively for each image in the second set of images; and determining one or more second scores for the one or more object classes for the second metadata vector based at least in part on the one or more second labels. In certain embodiments, the method further includes the steps of: determining a rank for one object class of the one or more object classes between the first metadata vector and the second metadata vector based at least in part on a first score associated with the first metadata vector and a second score associated with the second metadata vector, the first score corresponding to the one object class of the one or more object classes, the second score corresponding to the one object class of the one or more object classes.

In some embodiments, the method further includes the steps of: receiving a plurality of unlabeled images and a request including an indication of an object class of interest; and determining a plurality of metadata vectors associated with the plurality of unlabeled images, the plurality of metadata vectors including the first metadata vector and the second metadata vector. In certain embodiments, the method further includes the steps of: selecting one or more selected metadata vectors from the plurality of metadata vectors based at least in part on the one or more first scores and the one or more second scores.

In some embodiments, the method further includes the steps of: selecting a set of unlabeled images from the plurality of unlabeled images based at least in part on the one or more selected metadata vectors; and transmitting an indication of the selected set of unlabeled images to an image labeling system. In some embodiments, the selecting one or more selected metadata vectors from the plurality of metadata vectors comprises: selecting the first metadata vector if a first object score corresponding to the object class of interest is higher than a first threshold, wherein the first object score is one of the one or more first scores. In certain embodiments, the selecting one or more selected metadata vectors from the plurality of metadata vectors further comprises: selecting the first metadata if a second object score corresponding to an uninterested object class is lower than a second threshold, wherein the second object score is one of the one or more first scores.

According to certain embodiments, a system for image scoring is disclosed, where the system includes: one or more memories storing instructions thereon; one or more processors configured to execute the instructions and perform operations comprising: receiving a plurality of images, each image of the plurality of images associated with a geographic metadata, the plurality of images associated with one or more geographic metadata; selecting a first set of images from the plurality of images, each image in the first set of images being associated with a first geographic metadata that is one of the one or more geographic metadata; obtaining one or more first labels indicating one or more object classes respectively for each image in the first set of images; and determining one or more first scores for the one or more object classes for the first geographic metadata based at least in part on the one or more first labels. For example, the method is implemented according to at least FIG. 1, FIG. 3, and/or FIG. 4. In some embodiments, each geographic metadata of the one or more geographic metadata includes a geohash.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for image scoring, the method comprising:
- receiving a plurality of images associated with a plurality of geographic metadata;
- selecting a set of images from the plurality of images, each image in the set of images being associated with one of the plurality of geographic metadata;
- obtaining one or more labels indicating one or more object classes respectively for each image in the set of images;
- determining a plurality of scores for two or more geographic metadata of the plurality of geographic metadata with respect to one object class of the one or more object classes based at least in part on the one or more labels; and
- determining a ranking among the two or more geographic metadata with respect to the one object class based at least in part on the plurality of scores;
- wherein the method is performed using one or more processors.

2. The method of claim 1, wherein each geographic metadata of the plurality of geographic metadata includes a geohash.

3. A method for image scoring, the method comprising:
- receiving a plurality of images, each image of the plurality of images associated with a geographic metadata, the plurality of images associated with one or more geographic metadata;
- selecting a first set of images and a second set of images from the plurality of images, each image in the first set of images being associated with a first geographic metadata that is one of the one or more geographic metadata, each image in the second set of images being associated with a second geographic metadata that is one of the one or more geographic metadata;
- obtaining one or more first labels indicating one or more object classes respectively for each image in the first set of images and one or more second labels indicating the one or more object classes respectively for each image in the second set of images;
- determining one or more first scores for the one or more object classes for the first geographic metadata based at least in part on the one or more first labels and one or more second scores for the one or more object classes for the second geographic metadata based at least in part on the one or more second labels; and
- determining a ranking for one object class of the one or more object classes between the first geographic metadata and the second geographic metadata based at least in part on a first score of the one or more first scores corresponding to the one object class of the one or more object classes and a second score of the one or more second scores corresponding to the one object class of the one or more object classes;
- wherein the method is performed using one or more processors.

4. A method for image scoring, the method comprising:
receiving a plurality of images, each image of the plurality of images associated with a geographic metadata, the plurality of images associated with one or more geographic metadata;
selecting a first set of images and a second set of images from the plurality of images, each image in the first set of images being associated with a first geographic metadata that is one of the one or more geographic metadata, each image in the second set of images being associated with a second geographic metadata that is one of the one or more geographic metadata;
obtaining one or more first labels indicating one or more object classes respectively for each image in the first set of images and one or more second labels indicating the one or more object classes respectively for each image in the second set of images;
determining one or more first scores for the one or more object classes for the first geographic metadata based at least in part on the one or more first labels and one or more second scores for the one or more object classes for the second geographic metadata based at least in part on the one or more second labels;
receiving a plurality of unlabeled images and a request including an indication of an object class of interest; and
determining a plurality of geographic metadata associated with the plurality of unlabeled images, the plurality of geographic metadata including the first geographic metadata and the second geographic metadata;
wherein the method is performed using one or more processors.

5. The method of claim 4, further comprising:
selecting one or more selected geographic metadata from the plurality of geographic metadata based at least in part on the one or more first scores and the one or more second scores.

6. The method of claim 5, wherein the selecting one or more selected geographic metadata from the plurality of geographic metadata comprises:
selecting the first geographic metadata if a first object score corresponding to the object class of interest is higher than a first threshold, wherein the first object score is one of the one or more first scores.

7. The method of claim 6, wherein the selecting one or more selected geographic metadata from the plurality of geographic metadata further comprises:
selecting the first geographic metadata if a second object score corresponding to an uninterested object class is lower than a second threshold, wherein the second object score is one of the one or more first scores.

8. The method of claim 4, further comprising:
selecting a set of unlabeled images from the plurality of unlabeled images based at least in part on the one or more selected geographic metadata; and
transmitting an indication of the selected set of unlabeled images to an image labeling system.

9. A system for image scoring, the system comprising:
one or more memories storing instructions thereon; and
one or more processors configured to execute the instructions and perform operations comprising:
receiving a plurality of images associated with a plurality of geographic metadata;
selecting a set of images from the plurality of images, each image in the set of images being associated with one of the plurality of geographic metadata;
obtaining one or more labels indicating one or more object classes respectively for each image in the set of images;
determining a plurality of scores for two or more geographic metadata of the plurality of geographic metadata with respect to one object class of based at least in part on the one or more labels; and
determining a ranking among the two or more geographic metadata with respect to the one object class based at least in part on the plurality of scores.

10. The system of claim 9, wherein each geographic metadata of the plurality of geographic metadata includes a geohash.

11. A system for image scoring, the system comprising:
one or more memories storing instructions thereon; and
one or more processors configured to execute the instructions and perform operations comprising:
receiving a plurality of images, each image of the plurality of images associated with a geographic metadata, the plurality of images associated with one or more geographic metadata;
selecting a first set of images and a second set of images from the plurality of images, each image in the first set of images being associated with a first geographic metadata that is one of the one or more geographic metadata, each image in the second set of images being associated with a second geographic metadata that is one of the one or more geographic metadata;
obtaining one or more first labels indicating one or more object classes respectively for each image in the first set of images and one or more second labels indicating the one or more object classes respectively for each image in the second set of images;
determining one or more first scores for the one or more object classes for the first geographic metadata based at least in part on the one or more first labels and one or more second scores for the one or more object classes for the second geographic metadata based at least in part on the one or more second labels; and
determining a ranking for one object class of the one or more object classes between the first geographic metadata and the second geographic metadata based at least in part on a first score of the one or more first scores corresponding to the one object class of the one or more object classes and a second score of the one or more second scores corresponding to the one object class of the one or more object classes.

12. A system for image scoring, the system comprising:
one or more memories storing instructions thereon; and
one or more processors configured to execute the instructions and perform operations comprising:
receiving a plurality of images, each image of the plurality of images associated with a geographic metadata, the plurality of images associated with one or more geographic metadata;
selecting a first set of images and a second set of images from the plurality of images, each image in the first set of images being associated with a first geographic metadata that is one of the one or more geographic metadata, each image in the second set of images being associated with a second geographic metadata that is one of the one or more geographic metadata;
obtaining one or more first labels indicating one or more object classes respectively for each image in the first set of images and one or more second labels indicating the one or more object classes respectively for each image in the second set of images;

determining one or more first scores for the one or more object classes for the first geographic metadata based at least in part on the one or more first labels and one or more second scores for the one or more object classes for the second geographic metadata based at least in part on the one or more second labels;

receiving a plurality of unlabeled images and a request including an indication of an object class of interest; and determining a plurality of geographic metadata associated with the plurality of unlabeled images, the plurality of geographic metadata including the first geographic metadata and the second geographic metadata.

13. The system of claim 12, the operations further comprising:

selecting one or more selected geographic metadata from the plurality of geographic metadata based at least in part on the one or more first scores and the one or more second scores.

14. The system of claim 13, wherein the selecting one or more selected geographic metadata from the plurality of geographic metadata comprises:

selecting the first geographic metadata if a first object score corresponding to the object class of interest is higher than a first threshold, wherein the first object score is one of the one or more first scores.

15. The system of claim 14, wherein the selecting one or more selected geographic metadata from the plurality of geographic metadata further comprises:

selecting the first geographic metadata if a second object score corresponding to an uninterested object class is lower than a second threshold, wherein the second object score is one of the one or more first scores.

16. The system of claim 12, the operations further comprising:

selecting a set of unlabeled images from the plurality of unlabeled images based at least in part on the one or more selected geographic metadata; and transmitting an indication of the selected set of unlabeled images to an image labeling system.

* * * * *